United States Patent
Saunders et al.

(10) Patent No.: US 8,634,440 B2
(45) Date of Patent: Jan. 21, 2014

(54) TIME-DIVISION MULTIPLEXING PROCESSING CIRCUITRY

(75) Inventors: Spencer J Saunders, Bedfordshire (GB); Liam Dillon, Hertfordshire (GB); Rafal J Janta, Cambridge (GB)

(73) Assignee: ARM Limited, Cambridge (GB)

( * ) Notice: Subject to any disclaimer, the term of this patent is extended or adjusted under 35 U.S.C. 154(b) by 742 days.

(21) Appl. No.: 12/805,894

(22) Filed: Aug. 23, 2010

(65) Prior Publication Data

US 2012/0044957 A1 Feb. 23, 2012

(51) Int. Cl.
*H04J 3/04* (2006.01)
*G06F 17/50* (2006.01)

(52) U.S. Cl.
USPC .......................... 370/535; 716/116; 716/138

(58) Field of Classification Search
USPC .......... 370/463, 535–541; 716/100, 110, 116, 716/117, 136–139; 703/13, 14
See application file for complete search history.

(56) References Cited

U.S. PATENT DOCUMENTS 6,757,244 B1 * 6/2004 Redman ......................... 370/227
2008/0062897 A1 * 3/2008 Loffink et al. ................ 370/294

* cited by examiner

*Primary Examiner* — Kerri Rose
(74) *Attorney, Agent, or Firm* — Nixon & Vanderhye P.C.

(57) ABSTRACT

An integrated circuit including multiple instances of identical processing circuitry may be modelled within a field programmable gate array integrated circuit by second processing circuitry connected via a multiplexer to first processing circuitry and operating at a multiple of the clock frequency of the first processing circuitry. Demultiplexing circuitry is used to reform the multiple outputs of the respective separate instances to be fed back to the first processing circuitry.

28 Claims, 13 Drawing Sheets

RADDR = WADDR-1

RADDR = WADDR-2

TIME-DIVISION MULTIPLEXING PROCESSING CIRCUITRY

BACKGROUND OF THE INVENTION

1. Field of the Invention

This invention relates to the field of integrated circuits. More particularly, this invention relates to the time-division multiplexing of processing circuitry within an integrated circuit.

2. Description of the Prior Art

It is known to provide integrated circuits with multiple instances of the same processing circuitry formed on the integrated circuit and operated in parallel to increase data processing throughput. An example of such integrated circuits are those employing symmetric multiprocessor architectures in which multiple processing cores are formed on a single integrated circuit and controlled by a snoop control unit to ensure memory coherence between the multiple processor cores. A problem with these increasingly complex designs is that the large gate count makes it difficult to simulate the design with a field programmable gate array (FPGA) typically used during early development and to allow software to be developed prior to the integrated circuit itself being manufactured. The size of FPGA integrated circuits has generally not kept pace with the increase in gate count of integrated circuits, such as those employing SMP techniques. A consequence of this is that a single SMP integrated circuit may need to be represented by multiple FPGA integrated circuits. This has significant price and performance disadvantages. The FPGA integrated circuits are themselves expensive and a requirement for more of these to be used to provide the model of the eventual production integrated circuit is a disadvantage. Furthermore, the communication necessary between FPGA integrated circuits slows the overall operation of the model as such off-chip communications are typically slow compared to on-chip communications.

SUMMARY OF THE INVENTION

Viewed from one aspect the present invention provides a method of forming processing circuitry to provide processing corresponding to an integrated circuit comprising first processing circuitry coupled to N instances of further processing circuitry, said method comprising the steps of:

forming said first processing circuitry clocked by a first clock signal with a first clock frequency of $f_1$ and configured to perform processing operations to generate N parallel output signals of said first processing circuitry;

forming multiplexing circuitry coupled to said first processing circuitry and configured to receive said N parallel output signals of said first processing circuitry and to select as an output signal of said multiplexing circuitry one of said N parallel output signals of said first processing circuitry;

forming second processing circuitry coupled to said multiplexing circuitry to receive and to perform processing operations upon said output signal of said multiplexing circuitry to generate an output of said second processing circuitry, said second processing circuitry being clocked by a second clock signal with a second clock frequency $f_2$, where $f_2$ is $N*f_1$ and one clock period of said first clock signal corresponds to N clock periods of said second clock signal;

forming demultiplexing circuitry coupled to said second processing circuitry and configured to receive and to select said output of said second processing circuitry as one of N parallel output signals of said demultiplexing circuitry; and forming switching control circuitry coupled to said multiplexing circuitry and to said demultiplexing circuitry and configured to:

(i) control said multiplexing circuitry to select in turn each one of said N parallel output signals of said first processing circuitry to provide said output signal of said multiplexing circuitry for one clock period of said second clock signal while said second processing circuitry performs processing operations corresponding to one of said N instances of said further processing circuitry; and (ii) control said demultiplexing circuitry to select in turn each one of said N parallel outputs of said demultiplexing circuitry to be provided by said output signal of said second processing circuitry during one clock period of said second clock signal; wherein said second processing circuitry is formed to comprise N sets of storage elements, each of said N sets of storage elements being configured to store a set of state variables and to be exclusively available for access by other portions of said second processing circuitry during a respective different one of said N clock periods of said second clock signal.

The present techniques recognise that when an integrated circuit includes multiple instances of processing circuitry, it is possible to provide the processing which would be undertaken by those multiple instances by instead using a single instance of processing circuitry which is time-division multiplexed and clocked at a higher rate than the surrounding circuitry. As an example, in one clock period of the surrounding circuitry the processing circuitry which is being time-division multiplexed may be clocked N times with each of these N clock cycles representing the processing performed by a different instance corresponding to the processing circuitry in the integrated circuit being represented. Thus, in the example case of an SMP processor, multiple processor cores may be replaced by a suitably programmed portion of an FPGA array corresponding to a single processor core with that single processor core being time-division multiplexed such that on different processing cycles it performs the processing operations corresponding to different ones of the real processor cores.

It will be appreciated that the present techniques need not necessarily be used with field programmable gate array integrated circuits, but could be used with other forms of integrated circuits, and even in production integrated circuits where it is desired to reduce the gate count. Furthermore, the present techniques can be used in situations other than when the processing circuitry being time-division multiplexed represents a processor core, but this is a use to which the present technique is well suited. In this context, the first processing circuitry which is not time-division multiplexed may be a snoop-control unit within a symmetric multiprocessing system.

The second processing circuitry may include an ID bus used to provide an ID value indicative of the currently active processor being represented by the time-division multiplexed second processing circuitry at a particular point in time. In a real SMP system the separate cores may be provided with processor IDs that can be read under software control such that a program can determined upon which core it is being executed. This same behaviour can be provided by the time-division multiplexed second processing circuitry.

The state variables may be stored within memory blocks within a field programmable gate array. These memory blocks are typically provided as a general purpose component with field programmable gate arrays and are well suited to storing the state variables which are exclusively used by the different instances of the second processing circuitry.

The switching control circuitry used to control the time-division multiplexing may be statically or dynamically switched to support different values of N (the factor by which the time-division multiplexing is carried out).

The present techniques may also be performed recursively such that as well as the second processing circuitry being clocked multiple times to represent multiple instances of physical circuitry, the same technique may also be applied to the first processing circuitry with this being clocked at a different or the same number of times as the second processing circuitry and corresponding to a different or a same number of instances of the first processing circuitry.

The processing circuitry including the time-division multiplexed circuitry may be synthesized from data defining the original integrated circuit with the synthesis including adding the multiplexing circuitry and the demultiplexing circuitry and forming the corresponding second processing circuitry to provide the time-division multiplexed processing.

The step of forming the second processing circuitry opens the opportunity to retime the processing paths within the second circuitry corresponding to critical paths within the original instances of the real circuitry thereby permitting the second clock maximum frequency to be higher than the maximum clock frequency of the original instance clock.

Viewed from another aspect the present invention provides an integrated circuit comprising:

first processing circuitry clocked by a first clock signal with a first clock frequency of $f_1$ and configured to perform processing operations to generate N parallel output signals of said first processing circuitry;

multiplexing circuitry coupled to said first processing circuitry and configured to receive said N parallel output signals of said first processing circuitry and to select as an output signal of said multiplexing circuitry one of said N parallel output signals of said first processing circuitry;

second processing circuitry coupled to said multiplexing circuitry to receive and to perform processing operations upon said output signal of said multiplexing circuitry to generate an output of said second processing circuitry, said second processing circuitry being clocked by a second clock signal with a second clock frequency $f_2$, where $f_2$ is $N*f_1$ and one clock period of said first clock signal corresponds to N clock periods of said second clock signal;

demultiplexing circuitry coupled to said second processing circuitry and configured to receive and to select said output of said second processing circuitry as one of N parallel output signals of said demultiplexing circuitry; and switching control circuitry coupled to said multiplexing circuitry and to said demultiplexing circuitry and configured to:

(i) control said multiplexing circuitry to select in turn each one of said N parallel output signals of said first processing circuitry to provide said output signal of said multiplexing circuitry for one clock period of said second clock signal; and (ii) control said demultiplexing circuitry to select in turn each one of said N parallel outputs of said demultiplexing circuitry to be provided by said output signal of said second processing circuitry during one clock period of said second clock signal; wherein said second processing circuitry comprises N sets of storage elements, each of said N sets of storage elements being configured to store a set of state variables and to be exclusively available for access by other portions of said second processing circuitry during a respective different one of said N clock periods of said second clock signal.

Viewed from a further aspect the present invention provides an integrated circuit comprising:

first means for processing clocked by a first clock signal with a first clock frequency of $f_1$ and configured to perform processing operations to generate N parallel output signals of said first means for processing;

multiplexing means for multiplexing coupled to said first means for processing and configured to receive said N parallel output signals of said first means for processing and to select as an output signal of said multiplexing means one of said N parallel output signals of said first means for processing;

second means for processing coupled to said multiplexing means to receive and to perform processing operations upon said output signal of said multiplexing means to generate an output of said second means for processing, said second means for processing being clocked by a second clock signal with a second clock frequency $f_2$, where $f_2$ is $N*f_1$ and one clock period of said first clock signal corresponds to N clock periods of said second clock signal;

demultiplexing means for demultiplexing coupled to said second means for processing and configured to receive and to select said output of said second means for processing as one of N parallel output signals of said demultiplexing means; and switching control means for controlling said multiplexing means and to said demultiplexing means and configured to:

(i) control said multiplexing means to select in turn each one of said N parallel output signals of said first means for processing to provide said output signal of said multiplexing means for one clock period of said second clock signal; and (ii) control said demultiplexing means to select in turn each one of said N parallel outputs of said demultiplexing means to be provided by said output signal of said second means for processing during one clock period of said second clock signal; wherein said second means for processing comprises N sets of storage means for storing data values, each of said N sets of storage means being configured to store a set of state variables and to be exclusively available for access by other portions of said second means for processing during a respective different one of said N clock periods of said second clock signal.

Another aspect of the invention also provides a computer readable storage medium storing in non-transitory form a computer program for controlling a computer to perform the above techniques.

The above, and other objects, features and advantages of this invention will be apparent from the following detailed description of illustrative embodiments which is to be read in connection with the accompanying drawings.

DESCRIPTION OF THE EMBODIMENTS

Figure 1:
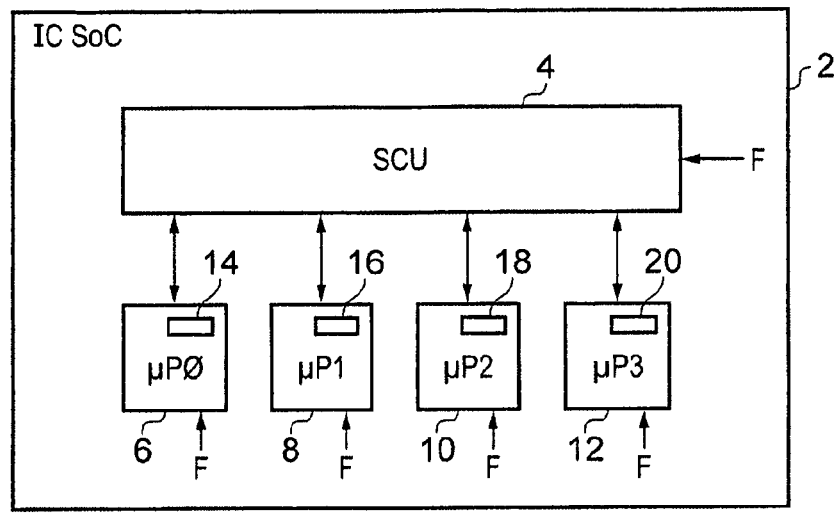
FIG. 1 schematically illustrates an integrated circuit including symmetric multiprocessing circuitry.

FIG. 1 schematically illustrates an integrated circuit 2 including a snoop control unit 4 and four processor cores 6, 8, 10, 12 arranged to operate in accordance with a symmetric multiprocessor architecture. Each of the snoop control unit 4 and the processors 6, 8, 10, 12 is clocked by a clock signal with a frequency f.

Each of the processors 6, 8, 10, 12 includes local storage 14, 16, 18, 20 storing state variables of the respective processor 6, 8, 10, 12. These state variables are accessible (both read and write) to the processor concerned itself but are not accessible to the other processors. Examples of the state variables of individual processors stored in this way would be the contents of the general purpose register bank of the processor, processor flags, status variables, configuration variables and the like. Each of the processors 6, 8, 10, 12 has an associated hardwired processor ID which may be queried by software executing on the processor core such that the software can determine on which of the processors 6, 8, 10, 12 it is being executed.

Figure 2:
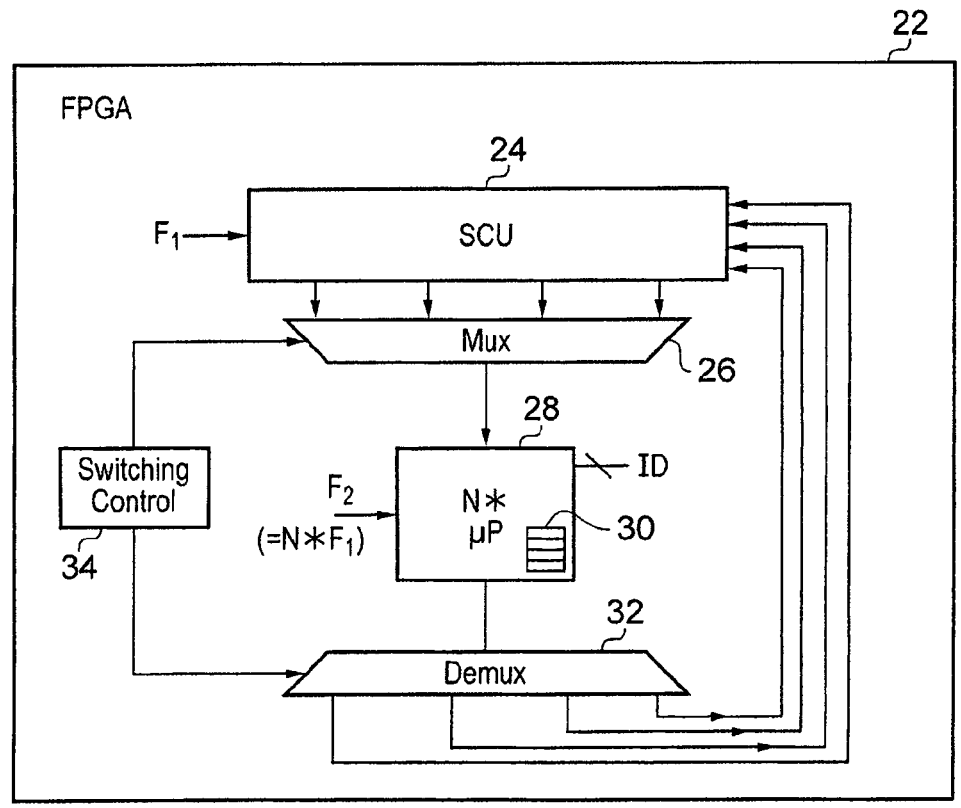
FIG. 2 schematically illustrates an FPGA integrated circuit including circuitry for performing processing corresponding to the circuitry of FIG. 1.

FIG. 2 schematically illustrates a field programmable gate array integrated circuit 22 implementing processing circuitry for performing processing corresponding to that of the integrated circuit of FIG. 1. The FPGA integrated circuit 22 includes first processing circuitry 24 in the form of a snoop control unit. This first processing circuit is clocked with a first clock signal having a first clock frequency $f_1$. Multiplexing circuitry 26 is coupled to the first processing circuitry 24 and receives four (more generally N) output signals (or sets of output signals) from the first processing circuitry 24. The multiplexing circuitry 26 selects one of these inputs to form its output which is then passed to second processing circuitry 28.

The second processing circuitry 28 is clocked by a second clock signal with a second clock frequency $f_2$ where $f_2$ is N times the first clock frequency $f_1$. In this way, N clock periods of the second clock signal are fitted within one clock period of the first clock signal. In each clock period of the second clock signal, the second processing circuitry 28 is configured (selected) to perform processing corresponding to a different one of the processors 6, 8, 10, 12 of FIG. 1. The second processing circuitry 28 includes a memory block 30 providing N sets of storage elements each of the sets of storage elements, storing private data which is accessible during a respective different one of the N clock periods of the second clock signal corresponding to different ones of the processors 6, 8, 10, 12.

Demultiplexing circuitry 32 receives the output from the second processing circuitry 28 and selects this output to serve as a corresponding one of the outputs back to the first processing circuitry 24 matching a respective instance of the processors 6, 8, 10, 12. Switching control circuitry 34 controls the switching of the multiplexing circuitry 26 and the demultiplexing circuitry 32.

In operation the first processing circuitry 24 generates four sets of outputs which are supplied to the multiplexing circuitry 26 during a clock period of the first clock signal. The multiplexing circuitry 26 then selects each of the sets of output signals in turn and applies them during a clock period of the second clock signal to the second processing circuitry 28 where they are processed using an appropriately selected set of storage elements within the memory block 30 and producing output signals which are then demultiplexed by the demultiplexing circuitry 32 to form an output to be fed back to the first processing circuitry 24. Thus, after, in this example, four clock periods of the second clock signal, all of the inputs from the multiplexing circuitry 26 have been selected and processed in turn and generated in turn corresponding outputs which have been demultiplexed by the demultiplexing circuitry 32 and fed back to the first processing circuitry 24. The second processing circuitry 28 thus serves as time-division multiplexed circuitry performing the processing which is performed in the real integrated circuit 2 by the respective different processors 6, 8, 10, 12.

Figure 3:
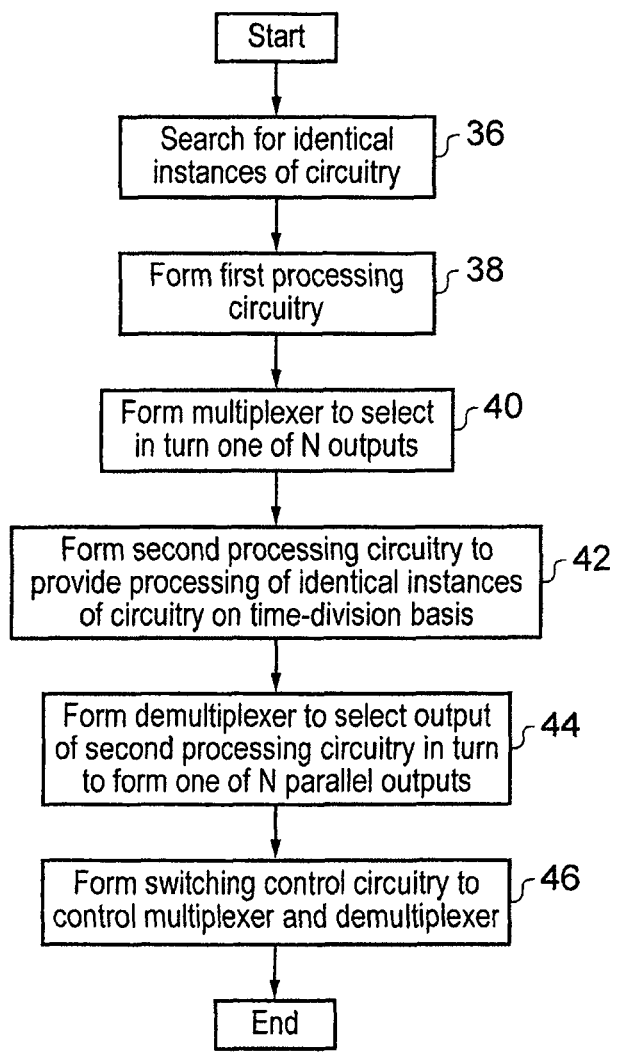
FIG. 3 is a flow diagram schematically illustrating how the FPGA integrated circuit of FIG. 2 may be configured.

FIG. 3 is a flow diagram schematically illustrating how the configuration of the FPGA integrated circuit 22 may be formed starting from the data defining the integrated circuit 2. At step 36 a search is made for identical instances of circuitry within the design. In this example these identical instances will be the respective processors 6, 8, 10, 12. Step 38 then forms the configuration for the first processing circuitry 24 in the form of the snoop control unit. This is an FPGA implementation of the snoop control unit 4 of FIG. 1. At step 40 multiplexer circuitry 26 is formed by configuring an appropriate portion of the FPGA integrated circuit 22 with this multiplexer being arranged to select in turn one of the outputs received from the first processing circuitry 24. At step 42 the second processing circuitry 28 is formed to provide processing identical to the individual instances of the repeated circuitry, but using a time-division multiplexed approach. This second processing circuitry is clocked at a multiple of the clock frequency of the first processing circuitry corresponding to the multiple of instances of the second processing circuitry relative to the first processing circuitry. The second processing circuitry is provided with storage elements which are configured to provide private storage corresponding to each processing cycle of the second processing circuitry in turn relating to a different one of the processors 6, 8, 10, 12. These private storage elements are accessible within that processing cycle, but are not accessible in the neighbouring processing cycles corresponding to different instances of the processors 6, 8, 10, 12. At step 44 the demultiplexing circuitry 32 is formed by appropriately configuring a portion of the FPGA integrated circuit 2. This demultiplexing circuitry receives the output from the second processing circuitry 28 and stores this so as to collect over the N processing cycles, N outputs from the second processing circuitry 28 which form N signals fed back to the first processing circuitry 24. At step 46 the switching control circuitry 34 is formed by configuring another portion of the FPGA integrated circuit 2. The switching control circuitry serves to control the multiplexing circuitry 26 and the demultiplexing circuitry 32 to select in turn from among the inputs and select for storage one of the N outputs.

It will be appreciated that the embodiment of FIG. 2 has been described in terms of an FPGA integrated circuit 22. The present techniques may also be used in conventional integrated circuits where a portion of the integrated circuit is used on a time-division multiplexed basis over a sequence of clock cycles to represent multiple processing circuitry which would otherwise be provided with a higher gate count.

The steps illustrated in FIG. 3 may be replaced in other embodiments by the following steps. In this example, the steps are used to implement a symmetric multiprocessing FPGA representation of a single A9 core:

1. A single A9 processor is synthesized. Caches are replaced by black-boxes.
2. A script replaces all flip-flops in post-synthesis Verilog file by N-register equivalents.
3. The modified post-synthesis Verilog is synthesized again with models of N-registers and N-caches.
4. The modified A9 processor is wrapped by multiplexers and demultiplexers. The multiplied N clock is used instead of the normal clock to drive the A9 processor.
5. The modified A9 processor is integrated with a snoop control unit.
6. Synthesis, place and route flow is performed as normal to create the FPGA design image.

Figure 4:
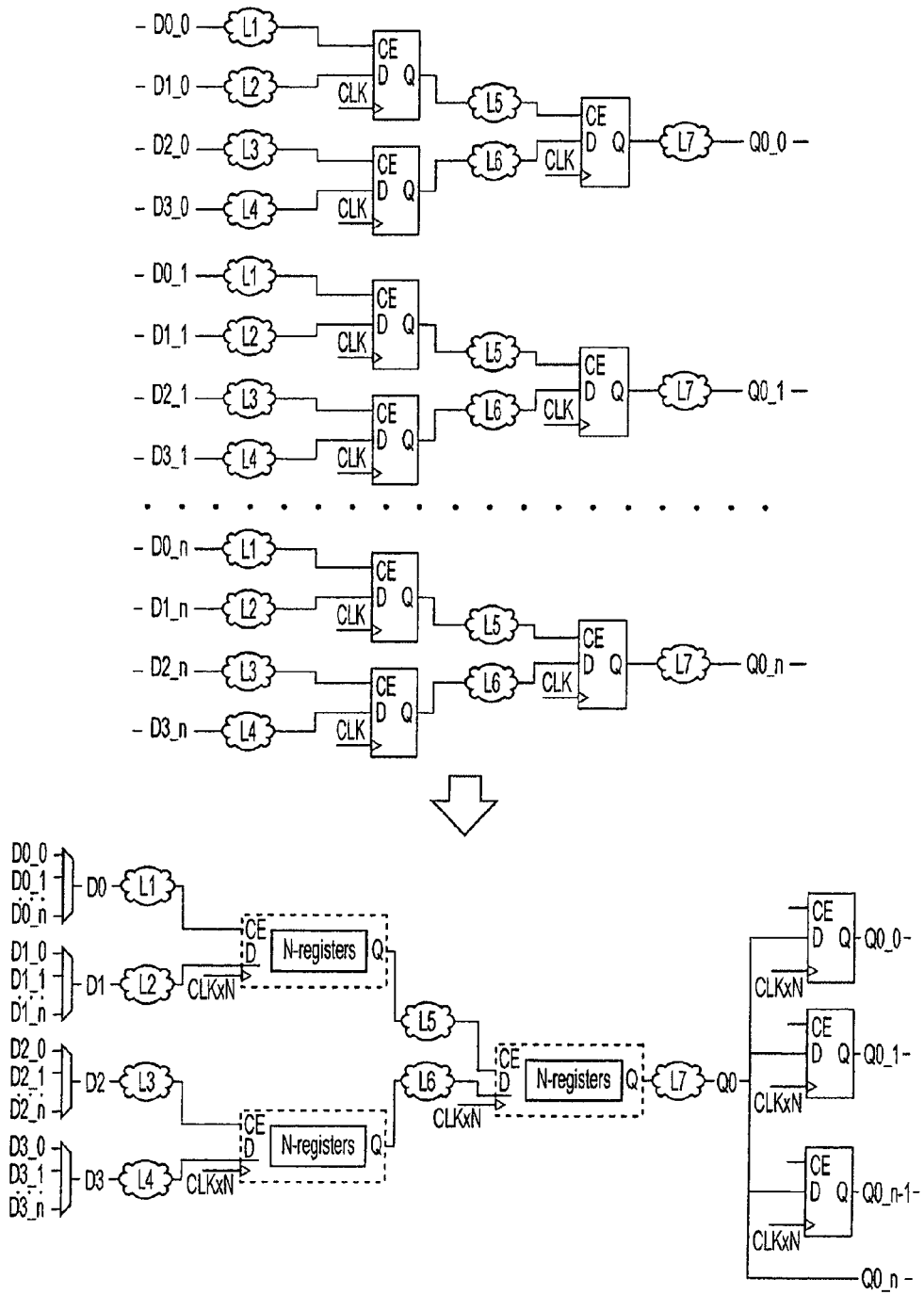
FIG. 4 is a diagram illustrating how multiple instances of combinatorial logic may be replaced by time-division multiplexed processing logic with appropriate multiplexing and demultiplexing.

FIG. 4 schematically illustrates how N instances of combinatorial logic which would normally be fully replicated for each instantiation of that combinatorial logic may be replaced by a single instantiation using the present technique. The use of multiplexing circuitry and register-based storage allows each input to be sequentially passed through the combinatorial logic, stored at each register position and passed onto the next portion of the combinatorial logic. Finally, the signals are de-multiplexed and presented at the outputs.

The modification of the design requires a clock running at N times the system clock frequency, some control logic and input/output multiplexing circuitry. The registers are replicated with selectable register based storage. The control logic sequentially cycles through the registers and routes each register output through the combinatorial logic and stores the output in the registers. FIG. 4 illustrates how this approach of time-division multiplexing reduces the amount of combinatorial logic used and how the registers through which cyclic sequencing is made are inserted into the design.

Figure 5:
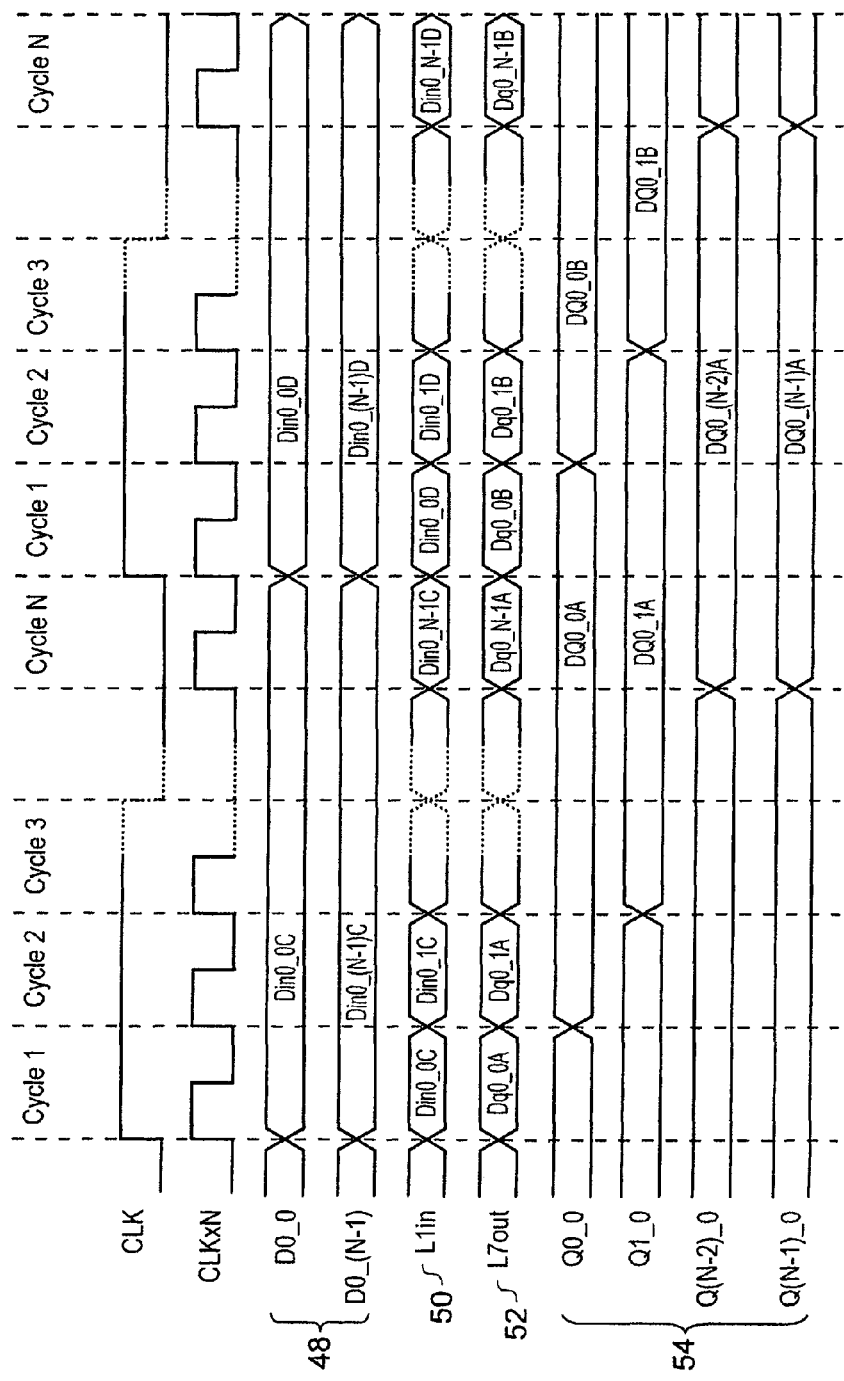
FIG. 5 is a signal diagram illustrating signals associated with the operation of the time-division multiplexed circuitry of FIG. 4.

FIG. 5 is a signal diagram showing how the inputs are serialised, processed, de-serialised and then presented to the outputs. The first clock signal is CLK, the second clock signal running at the multiple frequency is CLKxN. The inputs before serialisation are shown as signals 48. The serialised input signals are shown as signals 50. The serialised output signals are shown as signals 52. The de-serialised output signals are signals 54.

The N registers illustrated in FIG. 4 and used to store the time-division multiplexed values being processed within the pipeline combinatorial logic may be implemented in a variety of different ways as illustrated in FIGS. 6, 7, 8 and 9.

Figure 6:
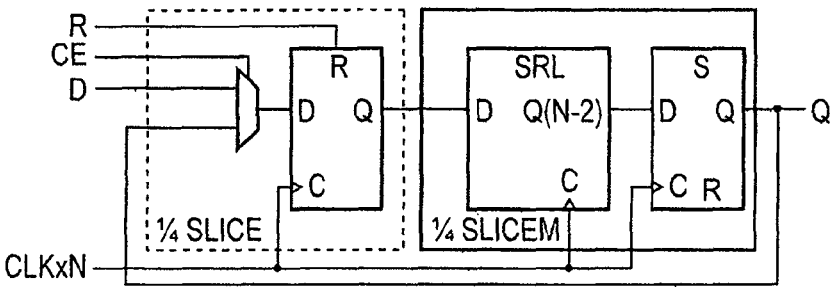
FIG. 6 is a first example embodiment of implementing N registers storing data values corresponding to different instances of processing circuitry being modelled.

FIG. 6 illustrates using a lookup table memory as shift registers to implement N-register storage.

Figure 7:
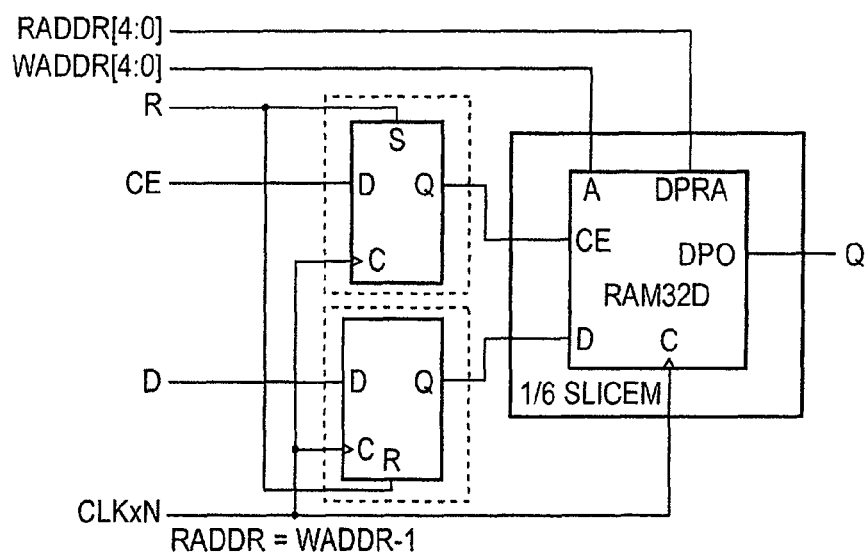
FIG. 7 is a second example embodiment of implementing N registers storing data values corresponding to different instances of processing circuitry being modelled.

FIG. 7 illustrates using distributed random access memory blocks within the FPGA as a way of implementing an N-register. This gives better FPGA utilisation and is easier to utilise when re-timing the combinatorial logic so as to retime critical paths within the circuit being represented by the FPGA so as to permit a higher clock frequency to be used.

Figure 8:
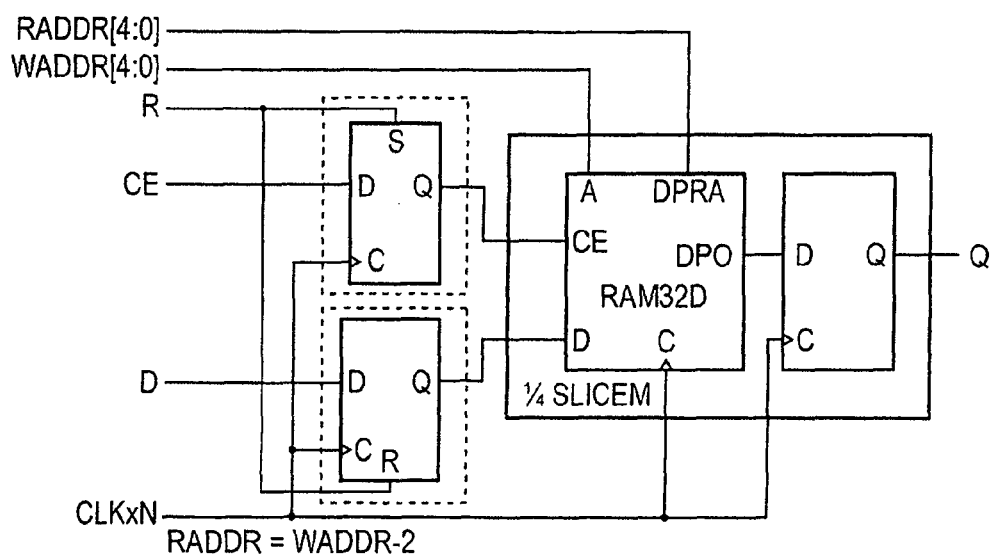
FIG. 8 a third example embodiment of implementing N registers storing data values corresponding to different instances of processing circuitry being modelled.
Figure 9:
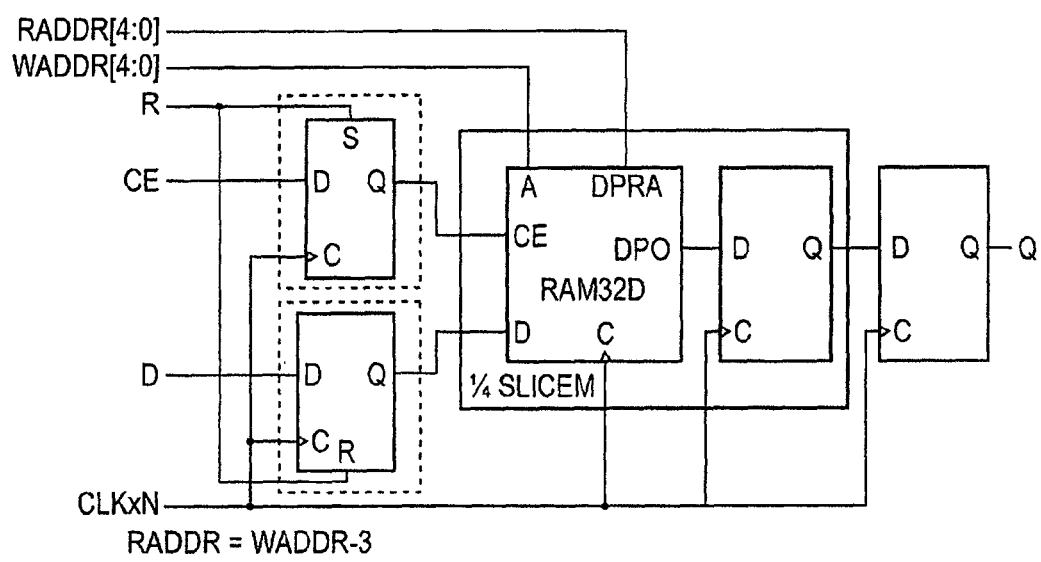
FIG. 9 a fourth example embodiment of implementing N registers storing data values corresponding to different instances of processing circuitry being modelled.

FIGS. 8 and 9 are further variants of the embodiment of FIG. 7. Each of these different embodiments gives a different FPGA utilisation and speed. The variant of FIG. 9 is particularly useful in allowing the synthesis tools to move the second output register to a different point within the combinatorial logic and accordingly retime the logic connected to its output so as to ease a critical path and allow higher speed operation.

The different types of the N-register implementations illustrated in FIGS. 6, 7, 8 and 9 may be mixed together dependent upon the required speed and utilisation. As an example, the registers within a design without an enable pin can be implemented using the shift register embodiment of FIG. 7 and the remaining registers can be implemented with the embodiments of FIGS. 7, 8 and 9.

Figure 10:
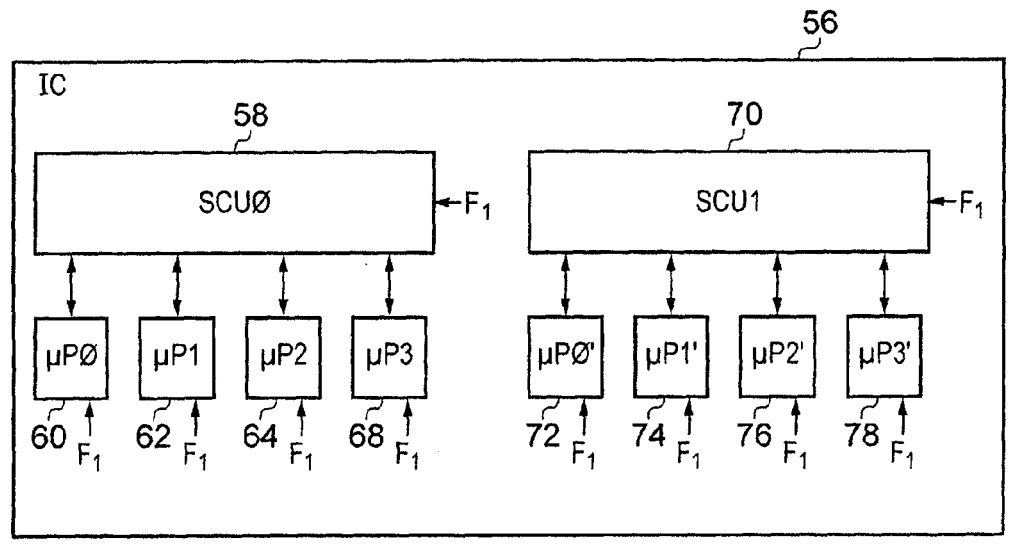
FIG. 10 is a diagram schematically illustrating an integrated circuit including multiple SMP instances each with a snoop control unit controlling multiple processors.
Figure 11:
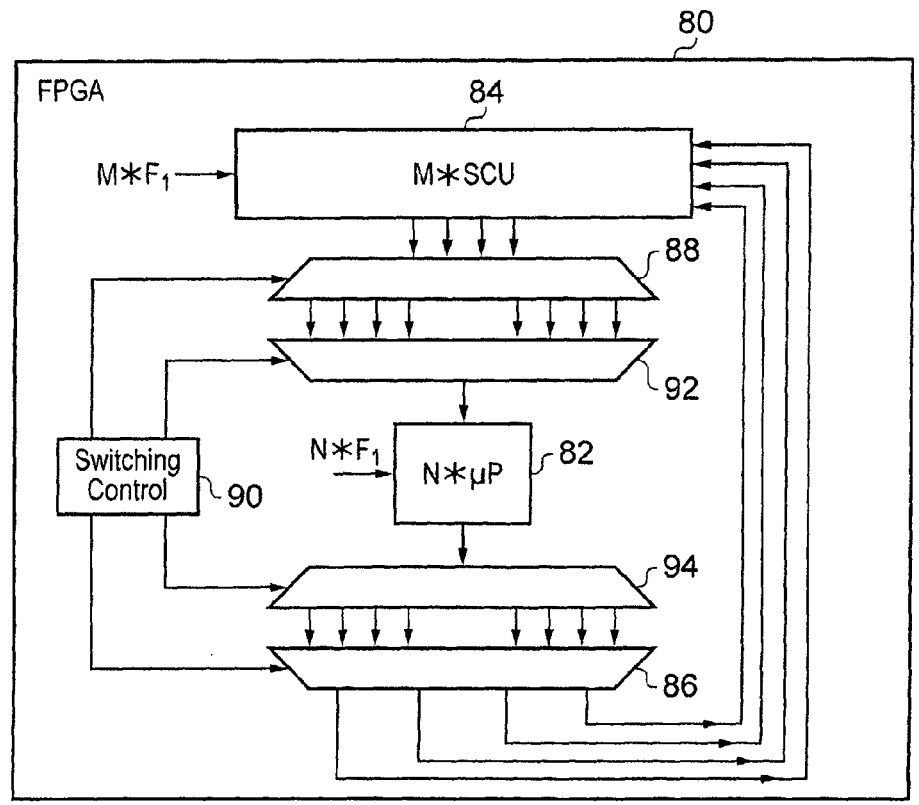
FIG. 11 schematically illustrates an FPGA integrated circuit configured to perform processing corresponding to the processing performed by the integrated circuit of FIG. 10.

FIG. 10 schematically illustrates an integrated circuit 56 including two SMP processor clusters. A first cluster comprises a snoop control unit 58 coupled to processors 60, 62, 64, 68. The second cluster comprises a snoop control unit 70 coupled to processors 72, 74, 76, 78. In this example embodiment, all of the processors 60, 62, 64, 68, 72, 74, 76, 78 are identical and can be provided within the FPGA integrated circuit 80 of FIG. 11 by second processing circuitry 82. The snoop control units 58 and 70 are also identical and can be provided by third processing circuitry 84 having a further multiplexer 86 and a further demultiplexer 88 coupled thereto.

The present technique is applied recursively with the different processors 60, 62, 64, 68, 72, 74, 76, 78 being replaced by the second processing circuitry 82 on a time-division multiplexed basis and the two snoop control units 58, 70 being replaced by the third processing circuitry 84 on a time-division multiplexed basis. The switching control unit 90 controls the further multiplexing circuitry 86 and the further demultiplexing circuitry 88 as well as the multiplexing circuitry 92 and the demultiplexing circuitry 94 associated with the second processing circuitry 82.

Figure 12:
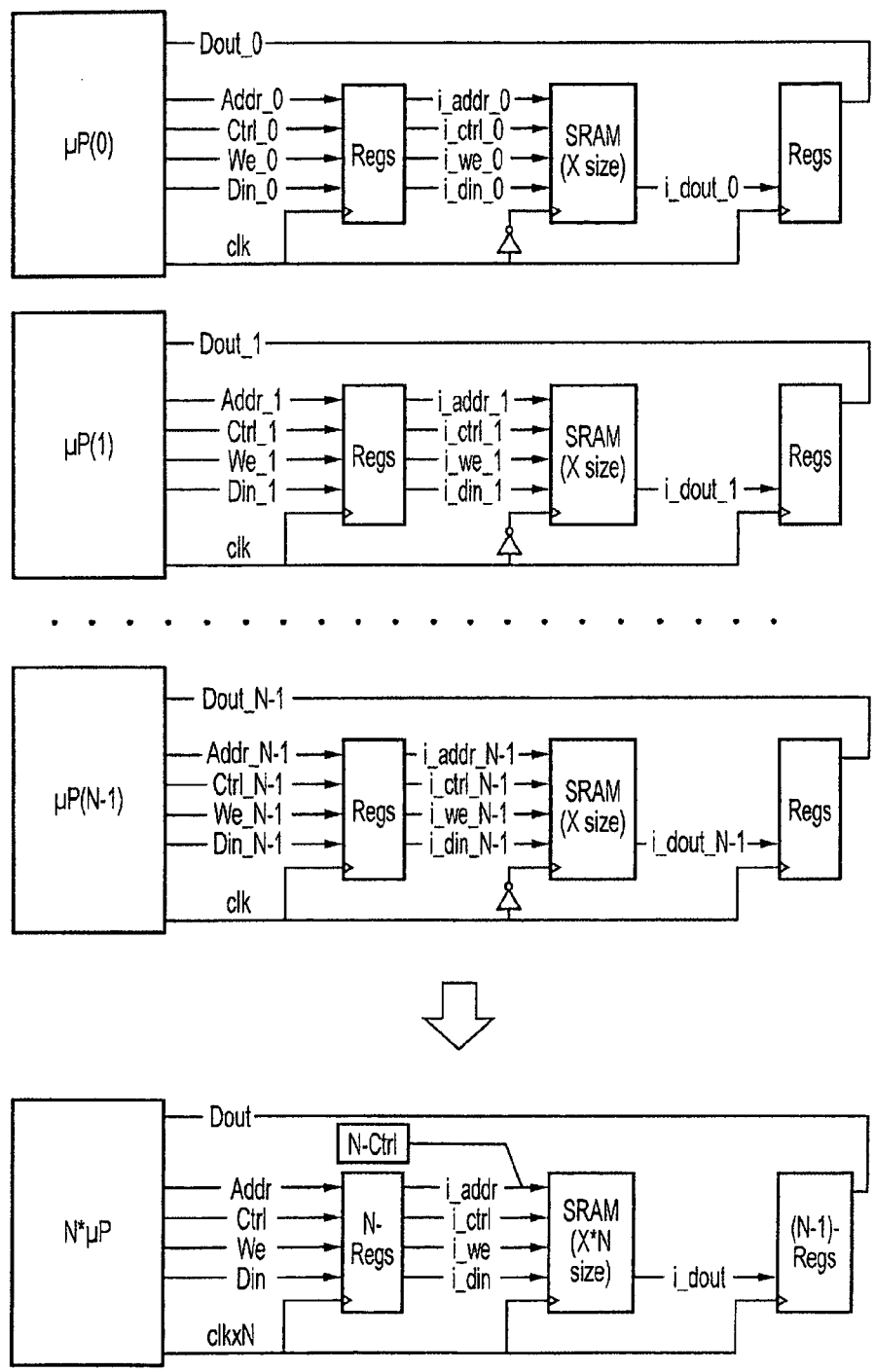
FIG. 12 schematically illustrates the provision of N-cache memories utilising the present techniques.

FIG. 12 schematically illustrates the use of the present technique in compressing the implementation of multiple cache memories. As illustrated, the circuitry to be implemented comprises multiple microprocessors each with an associated cache memory. The processors may be subject to the multiplexing and demultiplexing techniques previously described so as to be implemented in a shared block. In a similar manner, the multiple cache memories may also be implemented with multiplexers and demultiplexers, but in this case the storage capacity of the cache memory needs to be increased as all of the stored data will still need to be accommodated. The output of the caches is provided as (N−1) registers.

Figure 13:
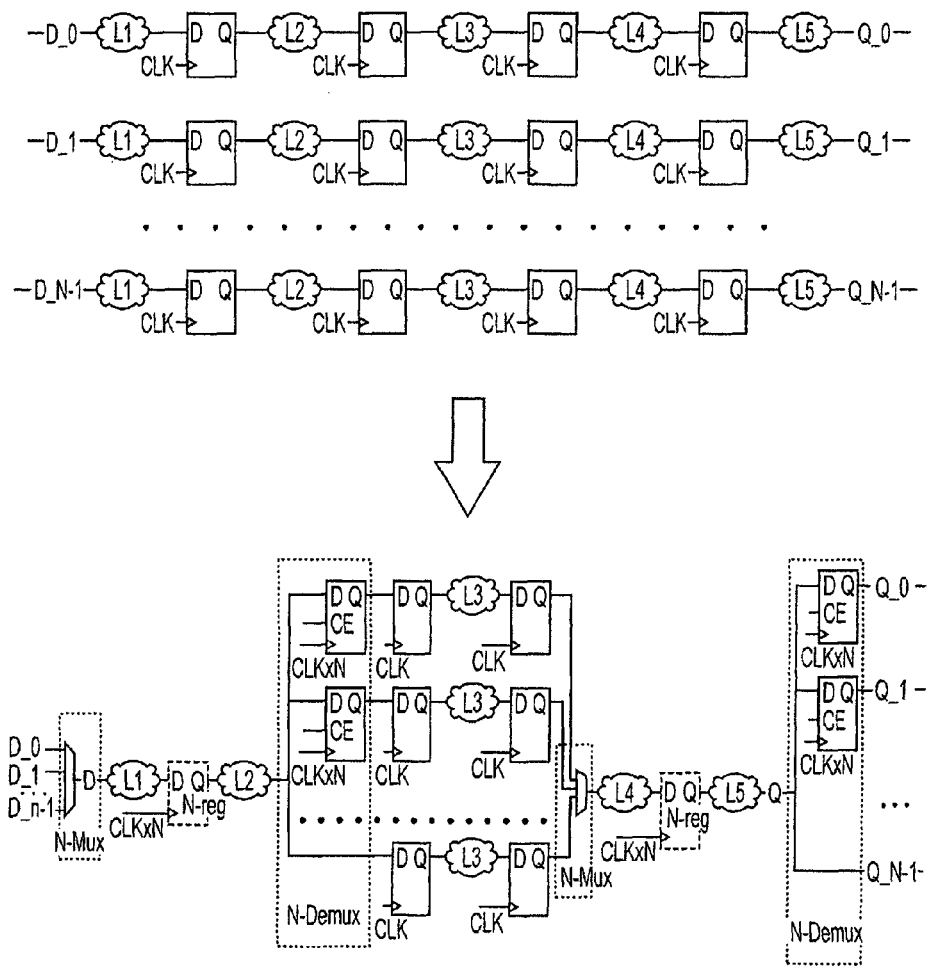
FIG. 13 schematically illustrates the use of demultiplexing and multiplexing within a compressed portion of an implementation to ease timing constraints.

FIG. 13 schematically illustrates the use of demultiplexing and multiplexing within a compressed portion of an implementation to ease timing constraints within the compressed portion. Thus, while the circuitry L1, L2, L4 and L5 is subject to compression with associated multiplexers and demultiplexers, the circuitry L3 is provided in multiple instances. Thus, while the circuitry L1, L2, L4 and L5 may be required to be clocked at a frequency of $N*f_1$, the circuitry L3 can be clocked in the original clock frequency domain of $f_1$. The circuitry L3 can be considered as being wrapped with a demultiplexer and multiplexer to move the circuitry L3 into the $f_1$ clock domain thereby easing the timing constraints associated with the circuitry L3. The eased timing constraints may be utilised by permitting the frequency $N*f_1$ to be raised as the circuitry L1, L2, L4 and L5 can operate correctly at such increased frequencies, whereas the circuitry L3 would not meet its timing constraints if operated at such a raised frequency.

Figure 14:
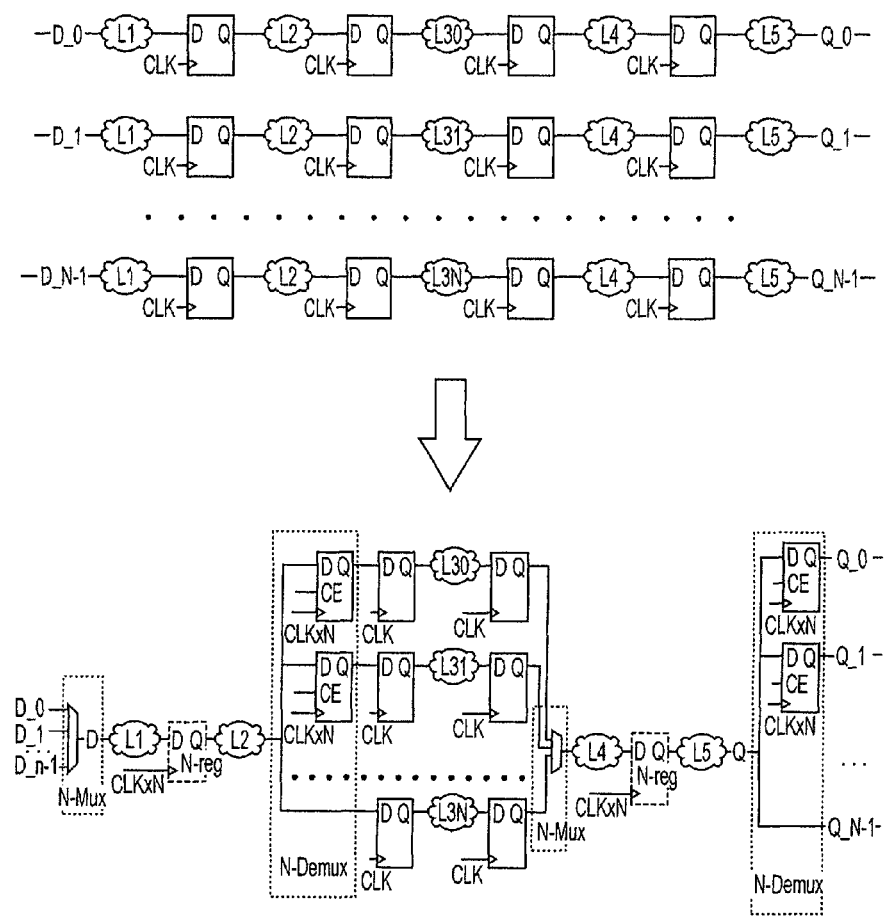
FIGS. 14 to 17 schematically illustrate the use of demultiplexing and multiplexing within a compressed portion to help support compression of a non-identical circuits.

FIG. 14 illustrates an example of how wrapping a portion of the circuitry within a demultiplexer and multiplexer so as to move it back to the base $f_1$ clock domain permits differences within this circuitry to be more readily tolerated. In this example, the circuitry L30, L31, ..., L3N has slight differences therebetween. These slight differences may be more readily accommodated by providing separate instances of these circuit portions L30, L31, ..., L3N within the base clock domain $f_1$ rather than trying to compress this particular portion of the implementation.

Figure 15:
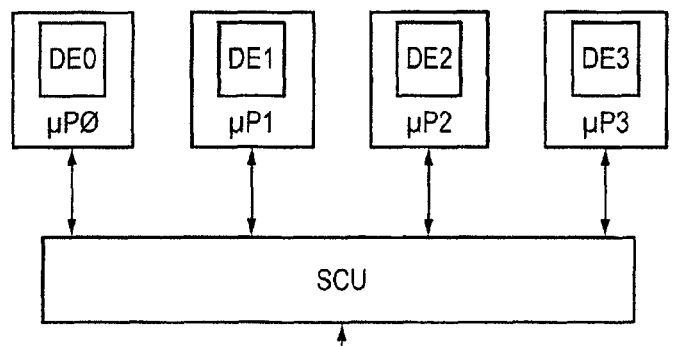
Figure 16:
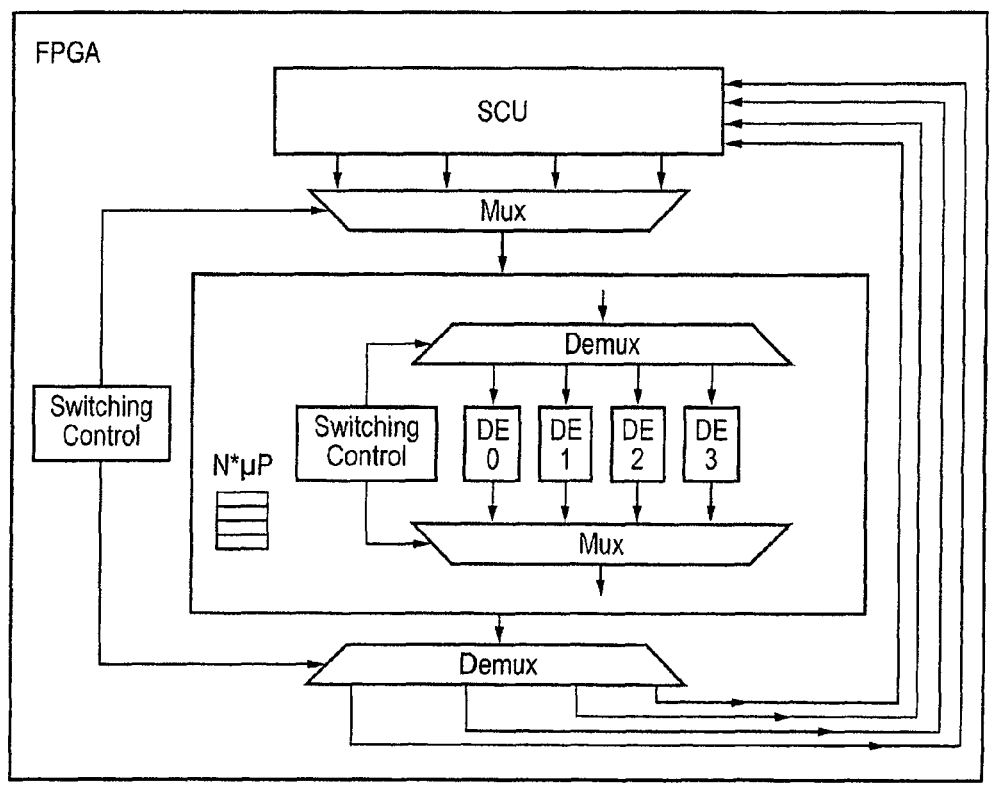
Figure 17:
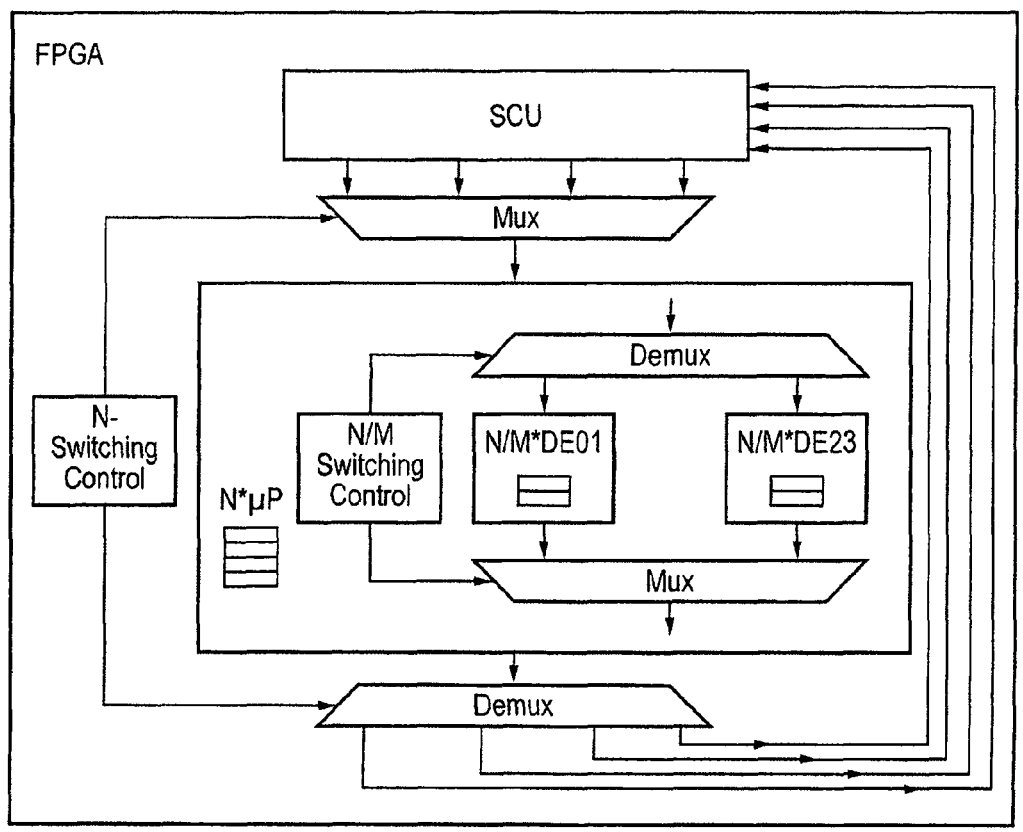

FIGS. 15, 16 and 17 illustrate how the use of demultiplexers and multiplexers within a compressed portion may be used to accommodate more significant differences between the circuits being compressed.

FIG. 15 schematically illustrates a multi-core system in which the processors are non-identical (non-symmetrical). In this case the data engines within each of the processors may differ. The circuitry surrounding the data engines within the different processors may be the same.

FIG. 16 illustrates an example embodiment in which the data engines are separately provided within a demulexplexer and multiplexer wrapper operating at the base frequency all within a compressed implementation of the N separate processors. Thus, the common circuitry shared between the different processors of FIG. 15 may be implemented using the time-division-multiplexing techniques previously described while the separate and different data engines of each processor may be separately provided within the basic clock domain.

FIG. 17 schematically illustrates another variation on the implementation of the multi-core system of FIG. 15. In this example, the data engines DE0 and DE1 are identical and the data engines DE2 and DE3 are identical. Thus, within the compressed implementation of the multiple processors the two different types of data engine are provided by separate circuit implementations although each of these circuit implementations is shared (time-division-multiplexed) between the respective two instances of that data engine. Thus, the data engines are not clocked at the base clock frequency of the original design of FIG. 15, but are instead clocked at an integer multiple of this basic clock frequency. In the example of FIG. 17 the compressed implementation of the common portions of the processors may be clocked at four times the clock frequency of the circuitry of FIG. 15. The separate instances of the data engines illustrated in FIG. 17 may each be clocked at two times the original design frequency as each of these instances of the data engines must provide the processing that would, for example, be provided by data engine DE0 and DE1 during one clock period of the basic clock frequency of the circuit of FIG. 15.

Figure 18:
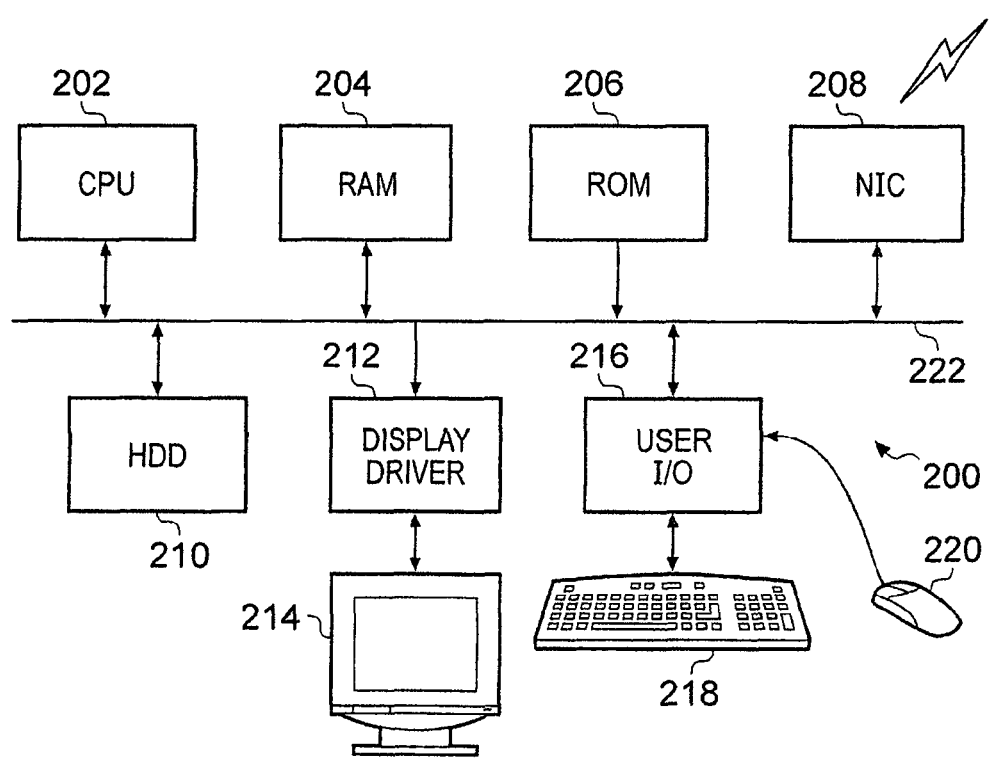
FIG. 18 is a diagram of a general purpose computer used to implement some of the above described techniques.

FIG. 18 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 6 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of forming processing circuitry to provide processing corresponding to an integrated circuit comprising first processing circuitry coupled to N instances of further processing circuitry, said method comprising the steps of:

forming said first processing circuitry clocked by a first clock signal with a first clock frequency of $f_1$ and configured to perform processing operations to generate N parallel output signals of said first processing circuitry;

forming multiplexing circuitry coupled to said first processing circuitry and configured to receive said N parallel output signals of said first processing circuitry and to select as an output signal of said multiplexing circuitry one of said N parallel output signals of said first processing circuitry;

forming second processing circuitry coupled to said multiplexing circuitry to receive and to perform processing operations upon said output signal of said multiplexing circuitry to generate an output of said second processing circuitry, said second processing circuitry being clocked by a second clock signal with a second clock frequency $f_2$, where $f_2$ is $N*f_1$ and one clock period of said first clock signal corresponds to N clock periods of said second clock signal;

forming demultiplexing circuitry coupled to said second processing circuitry and configured to receive and to select said output of said second processing circuitry as one of N parallel output signals of said demultiplexing circuitry; and forming switching control circuitry coupled to said multiplexing circuitry and to said demultiplexing circuitry and configured to:

(i) control said multiplexing circuitry to select in turn each one of said N parallel output signals of said first processing circuitry to provide said output signal of said multiplexing circuitry for one clock period of said second clock signal while said second processing circuitry performs processing operations corresponding to one of said N instances of said further processing circuitry; and (ii) control said demultiplexing circuitry to select in turn each one of said N parallel outputs of said demultiplexing circuitry to be provided by said output signal of said second processing circuitry during one clock period of said second clock signal; wherein said second processing circuitry is formed to comprise N sets of storage elements, each of said N sets of storage elements being configured to store a set of state variables and to be exclusively available for access by other portions of said second processing circuitry during a respective different one of said N clock periods of said second clock signal, wherein said first processing circuitry, said multiplexing circuitry, said second processing circuitry and said demultiplexing circuitry are provided as part of a field programmable gate array.

2. A method as claimed in claim 1, wherein said second processing circuitry is configured to serve as a processor core.

3. A method as claimed in claim 2, wherein said first processing circuitry is configured to serve as a snoop control unit within a symmetric multiprocessor system having N processors, processing performed by each of said N processors being provided by said second processing circuitry during a respective clock period of said second clock signal.

4. A method as claimed in claim 3, wherein said second processing circuitry includes an ID bus, said ID bus being driven by said second processing circuitry during each clock period of said second clock signal to carry an ID value indicative of in respect of which of said N processors said second processing logic is performing processing.

5. A method as claimed in claim 4, wherein said ID bus is readable under software control of a program executed by said second processing logic performing as one of said N processors.

6. A method as claimed in claim 1, wherein said field programmable gate array comprises one or more memory blocks configured to serve as said N sets of storage elements.

7. A method as claimed in claim 1, wherein said switching control circuitry is configurable to support different values of N.

8. A method as claimed in claim 1, wherein said switching control circuitry is dynamically configurable to support different values of N.

9. A method as claimed in claim 1, wherein said first processing circuitry is formed as:
further multiplexing circuitry configured to receive M parallel input signals from outside of said first processing circuitry and to select as an output signal of said further multiplexing circuitry one of said M parallel input signals;
third processing circuitry coupled to said further multiplexing circuitry to receive and to perform processing operation upon said output signal of said further multiplexing circuitry to generate an output of said third processing circuitry, said third processing circuitry being clocked by a third clock signal with a third clock frequency $f_3$, where $f_3$ is $M*f_1$ and one clock period of said first clock signal corresponds to M clock periods of said third clock signal;
further demultiplexing circuitry coupled to said third processing circuitry and configured to receive and to select said output of said third processing circuitry as one of M parallel output signals of said further demultiplexing circuitry; and
further switching control circuitry coupled to said further multiplexing circuitry and to said further demultiplexing circuitry and configured to:
(i) control said further multiplexing circuitry to select in turn each one of said M parallel input signals to provide said output signal of said further multiplexing circuitry for one clock period of said third clock signal; and
(ii) control said further demultiplexing circuitry to select in turn each one of said M parallel outputs of said further demultiplexing circuitry to be provided by said output signal of said third processing circuitry during one clock period of said third clock signal; wherein said third processing circuitry comprises M sets of further storage elements, each of said M sets of further storage elements storing a set of state variables and being configured to be exclusively available for access by other portions of said third processing circuitry during a respective one of said M clock periods of said third clock signal.

10. A method as claimed in claim 1, wherein said integrated circuit has an integrated circuit clock signal with a clock frequency of $f_1$ clocking said first processing circuitry and said N instances of said second processing circuitry.

11. A method as claimed in claim 1, wherein within said integrated circuit said N instances of further processing circuitry are connected in parallel to said second processing circuitry.

12. A method as claimed in claim 1, wherein said processing circuitry has a design synthesised from data defining said integrated circuit including adding said multiplexing circuitry and said demultiplexing circuitry and forming said second processing circuitry to provide time-division multiplexed processing corresponding to said N instances of further processing circuitry.

13. A method as claimed in claim 1, wherein said step of forming said second processing circuitry retimes processing paths within said second circuitry corresponding to critical paths within said N instances of further circuitry to permit said second clock frequency to be higher than N times a clock frequency of said integrated circuit.

14. A method as claimed in claim 1, wherein said second processing circuitry is formed to include a portion comprising further demultiplexing circuitry coupled to third processing circuitry clocked at a third clock frequency $f_3$, where $f_3$ is $N/M*f$, and $N/M$ is an integer, and further multiplexing circuitry coupled to said third processing circuitry.

15. An integrated circuit comprising:
first processing circuitry clocked by a first clock signal with a first clock frequency of $f_1$ and configured to perform processing operations to generate N parallel output signals of said first processing circuitry;
multiplexing circuitry coupled to said first processing circuitry and configured to receive said N parallel output signals of said first processing circuitry and to select as an output signal of said multiplexing circuitry one of said N parallel output signals of said first processing circuitry;
second processing circuitry coupled to said multiplexing circuitry to receive and to perform processing operations upon said output signal of said multiplexing circuitry to generate an output of said second processing circuitry, said second processing circuitry being clocked by a second clock signal with a second clock frequency $f_2$, where $f_2$ is $N*f_1$ and one clock period of said first clock signal corresponds to N clock periods of said second clock signal;
demultiplexing circuitry coupled to said second processing circuitry and configured to receive and to select said output of said second processing circuitry as one of N parallel output signals of said demultiplexing circuitry; and
switching control circuitry coupled to said multiplexing circuitry and to said demultiplexing circuitry and configured to:
(i) control said multiplexing circuitry to select in turn each one of said N parallel output signals of said first processing circuitry to provide said output signal of said multiplexing circuitry for one clock period of said second clock signal; and (ii) control said demultiplexing circuitry to select in turn each one of said N parallel outputs of said demultiplexing circuitry to be provided by said output signal of said second processing circuitry during one clock period of said second clock signal; wherein said second processing circuitry comprises N sets of storage elements, each of said N sets of storage elements being configured to store a set of state variables and to be exclusively available for access by other portions of said second processing circuitry during a respective different one of said N clock periods of said second clock signal, wherein said first processing circuitry, said multiplexing circuitry, said second processing circuitry and said demultiplexing circuitry are provided as part of a field programmable gate array.

16. An integrated circuit as claimed in claim 15, wherein said second processing circuitry is configured to serve as a processor core.

17. An integrated circuit as claimed in claim 16, wherein said first processing circuitry is configured to serve as a snoop control unit within a symmetric multiprocessor system having N processors, processing performed by each of said N processors being provided by said second processing circuitry during a respective clock period of said second clock signal.

18. An integrated circuit as claimed in claim 17, wherein said second processing circuitry includes an ID bus, said ID bus being driven by said second processing circuitry during each clock period of said second clock signal to carry an ID value indicative of in respect of which of said N processors said second processing logic is performing processing.

19. An integrated circuit as claimed in claim 18, wherein said ID bus is readable under software control of a program executed by said second processing logic performing as one of said N processors.

20. An integrated circuit as claimed in claim 15, wherein said field programmable gate array comprises one or more memory blocks configured to serve as said N sets of storage elements.

21. An integrated circuit as claimed in claim 15, wherein said switching control circuitry is configurable to support different values of N.

22. An integrated circuit as claimed in claim 15, wherein said switching control circuitry is dynamically configurable to support different values of N.

23. An integrated circuit as claimed in claim 15, wherein said first processing circuitry is formed as:

further multiplexing circuitry configured to receive M parallel input signals from outside of said first processing circuitry and to select as an output signal of said further multiplexing circuitry one of said M parallel input signals;

third processing circuitry coupled to said further multiplexing circuitry to receive and to perform processing operation upon said output signal of said further multiplexing circuitry to generate an output of said third processing circuitry, said third processing circuitry being clocked by a third clock signal with a third clock frequency $f_3$, where $f_3$ is $M*f_1$ and one clock period of said first clock signal corresponds to M clock periods of said third clock signal;

further demultiplexing circuitry coupled to said third processing circuitry and configured to receive and to select said output of said third processing circuitry as one of M parallel output signals of said further demultiplexing circuitry; and further switching control circuitry coupled to said further multiplexing circuitry and to said further demultiplexing circuitry and configured to:

(i) control said further multiplexing circuitry to select in turn each one of said M parallel input signals to provide said output signal of said further multiplexing circuitry for one clock period of said third clock signal; and (ii) control said further demultiplexing circuitry to select in turn each one of said M parallel outputs of said further demultiplexing circuitry to be provided by said output signal of said third processing circuitry during one clock period of said third clock signal; wherein said third processing circuitry comprises M sets of further storage elements, each of said M sets of further storage elements storing a set of state variables and being configured to be exclusively available for access by other portions of said third processing circuitry during a respective one of said M clock periods of said third clock signal.

24. An integrated circuit as claimed in claim 15, comprising further demultiplexing circuitry coupled to third processing circuitry clocked at a third clock frequency $f_3$, where $f_3$ is $N/M*f$, and N/M is an integer, and further multiplexing circuitry coupled to said third processing circuitry.

25. An integrated circuit comprising:

first means for processing clocked by a first clock signal with a first clock frequency of $f_1$ and configured to perform processing operations to generate N parallel output signals of said first means for processing;

multiplexing means for multiplexing coupled to said first means for processing and configured to receive said N parallel output signals of said first means for processing and to select as an output signal of said multiplexing means one of said N parallel output signals of said first means for processing;

second means for processing coupled to said multiplexing means to receive and to perform processing operations upon said output signal of said multiplexing means to generate an output of said second means for processing, said second means for processing being clocked by a second clock signal with a second clock frequency $f_2$, where $f_2$ is $N*f_1$ and one clock period of said first clock signal corresponds to N clock periods of said second clock signal;

demultiplexing means for demultiplexing coupled to said second means for processing and configured to receive and to select said output of said second means for processing as one of N parallel output signals of said demultiplexing means; and switching control means for controlling said multiplexing means and to said demultiplexing means and configured to:

(i) control said multiplexing means to select in turn each one of said N parallel output signals of said first means for processing to provide said output signal of said multiplexing means for one clock period of said second clock signal; and (ii) control said demultiplexing means to select in turn each one of said N parallel outputs of said demultiplexing means to be provided by said output signal of said second means for processing during one clock period of said second clock signal; wherein said second means for processing comprises N sets of storage means for storing data values, each of said N sets of storage means being configured to store a set of state variables and to be exclusively available for access by other portions of said second means for processing during a respective different one of said N clock periods of said second clock signal, wherein said first means for processing, said multiplexing means, said second means for processing, and said demultiplexing means are provided as part of a field programmable gate array.

26. A computer program product storing in non-transitory form a computer program for controlling a computer to perform a method as claimed in claim 1.

27. A method of forming processing circuitry to provide processing corresponding to an integrated circuit comprising first processing circuitry coupled to N instances of further processing circuitry, said method comprising the steps of:

forming said first processing circuitry clocked by a first clock signal with a first clock frequency of $f_1$ and configured to perform processing operations to generate N parallel output signals of said first processing circuitry;

forming multiplexing circuitry coupled to said first processing circuitry and configured to receive said N parallel output signals of said first processing circuitry and to select as an output signal of said multiplexing circuitry one of said N parallel output signals of said first processing circuitry;

forming second processing circuitry coupled to said multiplexing circuitry to receive and to perform processing operations upon said output signal of said multiplexing circuitry to generate an output of said second processing circuitry, said second processing circuitry being clocked by a second clock signal with a second clock frequency $f_2$, where $f_2$ is $N*f_1$ and one clock period of said first clock signal corresponds to N clock periods of said second clock signal;

forming demultiplexing circuitry coupled to said second processing circuitry and configured to receive and to select said output of said second processing circuitry as one of N parallel output signals of said demultiplexing circuitry; and forming switching control circuitry coupled to said multiplexing circuitry and to said demultiplexing circuitry and configured to:

(i) control said multiplexing circuitry to select in turn each one of said N parallel output signals of said first processing circuitry to provide said output signal of said multiplexing circuitry for one clock period of said second clock signal while said second processing circuitry performs processing operations corresponding to one of said N instances of said further processing circuitry; and (ii) control said demultiplexing circuitry to select in turn each one of said N parallel outputs of said demultiplexing circuitry to be provided by said output signal of said second processing circuitry during one clock period of said second clock signal; wherein said second processing circuitry is formed to comprise N sets of storage elements, each of said N sets of storage elements being configured to store a set of state variables and to be exclusively available for access by other portions of said second processing circuitry during a respective different one of said N clock periods of said second clock signal, wherein said processing circuitry has a design synthesised from data defining said integrated circuit including adding said multiplexing circuitry and said demultiplexing circuitry and forming said second processing circuitry to provide time-division multiplexed processing corresponding to said N instances of further processing circuitry.

28. A computer program product storing in non-transitory form a computer program for controlling a computer to perform a method as claimed in claim 27.

* * * * *